United States Patent [19]
Fitzpatrick et al.

[11] Patent Number: 5,428,678
[45] Date of Patent: Jun. 27, 1995

[54] TELEPHONE CALLING METHOD AND APPARATUS

[75] Inventors: Gregory P. Fitzpatrick, Fort Worth; William E. Warren, Richland Hills; Marvin L. Williams, Lewisville, all of Tex.

[73] Assignee: International Business Machines Corporation, Armonk, N.Y.

[21] Appl. No.: 998,274

[22] Filed: Dec. 30, 1992

[51] Int. Cl.⁶ .......................... H04M 3/42; H04M 1/26
[52] U.S. Cl. .................................... 379/201; 379/210; 379/355; 395/161
[58] Field of Search ............... 379/210, 211, 212, 213, 379/201, 70, 67, 89, 69, 355; 395/155, 161

[56] References Cited

U.S. PATENT DOCUMENTS

| | | | |
|---|---|---|---|
| 4,313,035 | 1/1982 | Jordan et al. | 379/207 |
| 4,608,460 | 8/1986 | Carter et al. | 379/201 |
| 4,752,951 | 6/1988 | Konneker | 379/211 |
| 4,860,342 | 8/1989 | Danner | 379/354 |
| 5,008,930 | 4/1991 | Gawrys et al. | 379/210 |
| 5,046,188 | 9/1991 | Molnar | 379/201 |
| 5,109,405 | 4/1992 | Morganstein | 379/210 |
| 5,138,655 | 8/1992 | Takashima et al. | 379/211 |
| 5,175,760 | 12/1992 | Ohashi et al. | 379/212 |
| 5,239,577 | 8/1993 | Bates et al. | 379/201 |
| 5,243,645 | 9/1993 | Bissell et al. | 379/211 |
| 5,270,701 | 12/1993 | Ito et al. | 379/211 |
| 5,329,578 | 7/1994 | Brennan et al. | 379/67 |

FOREIGN PATENT DOCUMENTS 0109363 6/1985 Japan .
9170838 5/1991 WIPO .

OTHER PUBLICATIONS

R. J. Torres "Graphical Phone Time Billing and Accounting" Research Disclosure, No. 292, published Aug., 1988.
J. P. Vincent and M. L. Williams "Methodology for Electronic Mail Negotiation for A Reply-After Time Period" IBM Technical Disclosure Bulletin, vol. 34, No. 6, pp. 465-466, publ. Nov., 1991.
A. M. Peters and J. P. Vincent "Printing Calendar Day Flags" IBM Technical Disclosure Bulletin, vol. 33, No. 7, pp. 275-276, publ. Dec., 1990.
M. E. Dillon, R. S. Hurley and L. C. Queen "Intelligent Network Phone Mail" IBM Technical Disclosure Bulletin, vol. 33, No. 1A, p. 64, publ. Jun., 1990.
H. F. Hertel, M. D. McConaughy and J. H. Wilson "User/Answering Machine Interface for Handling Incoming Telephone Calls" IBM Technical Disclosure Bulletin, vol. 29, No. 4, p. 1540, publ. Sep., 1986.
S. S. Soo "Interfacing a Computer to A Telephone Exchange" IBM Technical Disclosure Bulletin, pp. 1506-1511, publ. Sep., 1976.
S. P. Heggestad, B. B. Merwald and J. M. Pringle "Graphic Office Interface" IBM Technical Disclosure Bulletin, vol. 34, No. 1, pp. 266-269, published Jun., 1991.
S. J. Boies, J. D. Gould, W. A. Notz, J. T. Richards and J. W. Schoonard "User Interface for Audio Communi- (List continued on next page.)

Primary Examiner—James L. Dwyer
Assistant Examiner—Scott L. Weaver
Attorney, Agent, or Firm—Norman L. Gundel

[57] ABSTRACT

A method and data processing system are disclosed for placing a telephone call. In one embodiment, the invention, in response to user designation of a party and input of a CALL command, searches an electronic calendar database for information describing the scheduled location of the designated party and places a call to the scheduled location of the designated party. In another embodiment, the invention, in response to user selection of an electronic calendar event and input of a CALL command, searches an electronic calendar database for information describing the scheduled location of the event and places a call to the scheduled location of the event. In either embodiment, the invention may search an electronic directory database for a telephone number associated with the scheduled location of the designated party or event.

10 Claims, 3 Drawing Sheets

OTHER PUBLICATIONS cation System" IBM Technical Disclosure Bulletin, vol. 25, No. 7A, pp. 3371–3377, publ. Dec., 1982.

P. F. J. Smeenk "Sopho-Supervisor 50: An Intelligent Workstation for Sopho-PABXs" Philips Telecommunication Review vol. 46, No. 4, pp. 47–61, published Dec., 1988, Hilversum NL.

G. P. Fitzpatrick, B. K. Jackson and M. L. Williams "An Electronic Calendar Communication Device" Research Disclosure, No. 334, published Feb., 1992.

D. L. Griffin, S. F. Griffin and P. J. Keane "Technique for Initiating a Conference Call from a Calendar Database" IBM Technical Disclosure Bulletin, vol. 33, No. 9, p. 58, published Feb., 1991.

S. G. Berkson, S. B. Joshi and A. Litman "Computer-Telephone Software Interface" IBM Technical Disclosure Bulletin, vol. 33, No. 4, pp. 149–150, published Sep., 1990.

J. P. Vincent "Calendar Call Items" IBM Technical Disclosure Bulletin, vol. 32, No. 12, pp. 124–125, published May, 1990.

A. D. Moldover "Enhanced Personal Reminder Facility" IBM Technical Disclosure Bulletin, vol. 30, No. 2, p. 656, published Jul., 1987.

K. P. McGlynn "Mail Paging and Reminder Forwarding System" IBM Technical Disclosure Bulletin, vol. 29, No. 12, pp. 5201–5202, published May, 1987.

C. Cree, G. J. Landry, K. J. Scully and H. S. Singh "Generalized Request/Reply Mechanism for Use In Asynchronous Distributed Environments" IBM Technical Disclosure Bulletin, vol. 29, No. 8, pp. 3345–3357, published Jan., 1987.

C. H. Sederholm and J. W. Van den Berg "Intelligent Telephone" IBM Technical Disclosure Bulletin, pp. 4006–4008, published Feb., 1981.

TELEPHONE CALLING METHOD AND APPARATUS

BACKGROUND OF THE INVENTION

1. Field of the Invention

The present invention relates to telephone calling systems and in particular to a telephone calling system that, upon designation of a party to be called, will place a call to the scheduled location of the party to be called.

2. Description of the Related Art

A data processing system that includes an electronic telephone dialer allows a person, called a user, using the data processing system to select an event in an electronic telephone directory resident in the data processing system. The system will, in response, place a telephone call to the telephone number associated with the directory entry. However, the party called may be away from the location of the telephone number. Another party may answer the telephone call, or an automatic telephone answering service may respond to the incoming telephone call. However, neither may satisfy a caller who prefers to speak directly to the party called.

Many data processing systems include electronic calendars. Such calendars maintain calendar entries that contain information describing the scheduled location of the calendar's owner. This information describing the scheduled location may include the names of persons the calendar owner expects to meet with, the locations of such meetings, and an external telephone number or internal telephone extension at the location of such meetings. Individual calendar entries may also have beginning times and ending times or durations on individual day or days. Therefore, a telephone calling system is desired that can use the electronic calendar information describing the scheduled location of the designated party to place a call to the scheduled location.

SUMMARY OF THE INVENTION

In accordance with the present invention, a method and data processing system are disclosed for placing a telephone call. In one embodiment, the invention, in response to user designation of a party and input of a CALL command, searches an electronic calendar database for information describing the scheduled location of the designated party and places a call to the scheduled location of the designated party. In another embodiment, the invention, in response to user selection of an electronic calendar event and input of a CALL command, searches an electronic calendar database for information describing the scheduled location of the event and places a call to the scheduled location of the event. In either embodiment, the invention may search an electronic directory database for a telephone number associated with the scheduled location of the designated party or event.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

This application incorporates by reference concurrently filed, commonly owned United States patent application Ser. No. 07/998,197, filed Dec. 30, 1992, entitled "Telephone Answering Method and Apparatus".

Figure 1:
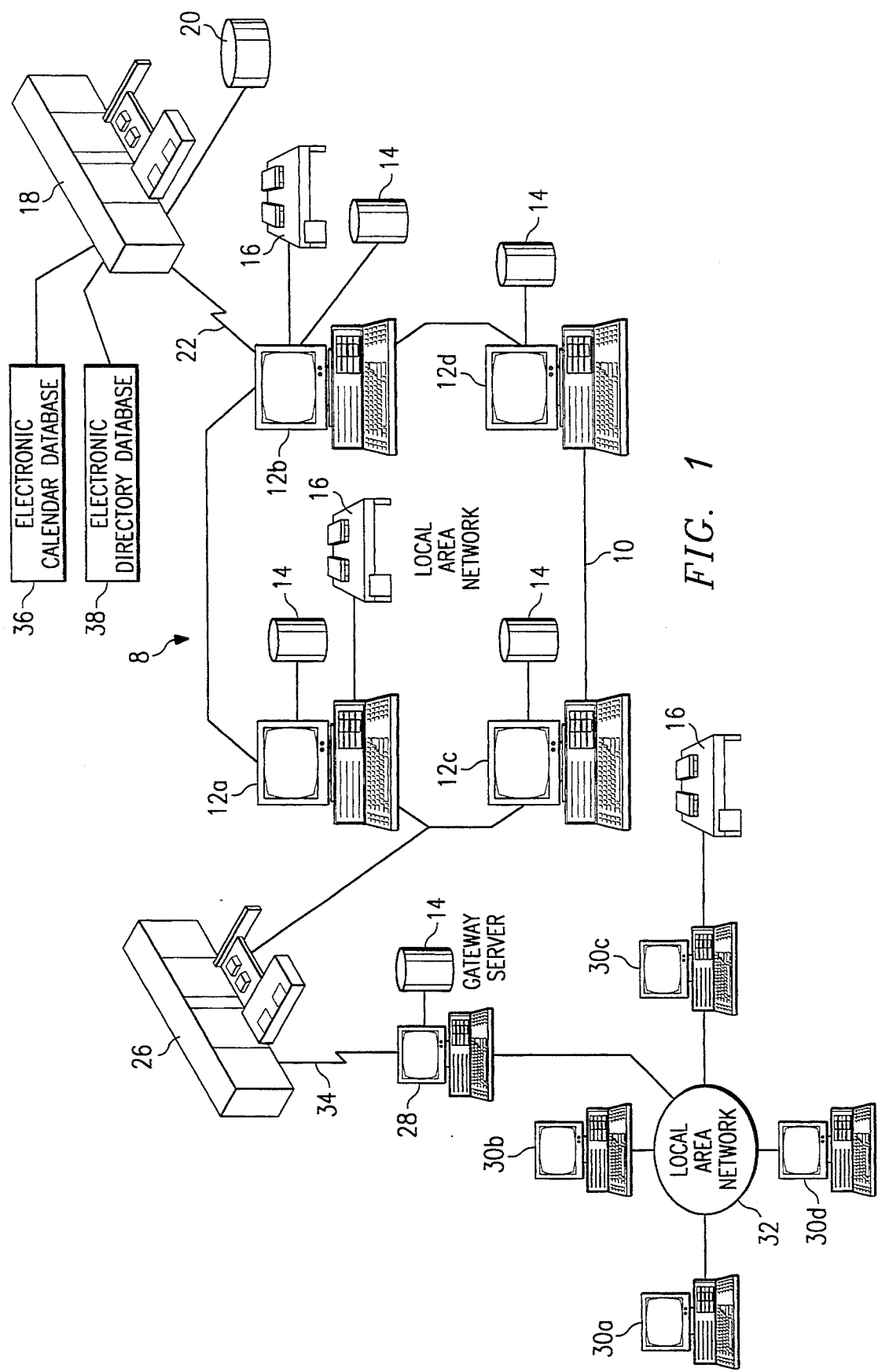
FIG. 1 is a block diagram of an apparatus used in performing the method of a preferred embodiment of the present invention and forming a part of the apparatus of a preferred embodiment of the present invention.

With reference now to the figures, and in particular with reference to FIG. 1, there is shown a pictorial representation of a data processing system 8 which may be utilized to implement the method and apparatus of the present invention. As may be seen, data processing system 8 may include a plurality of networks, such as local area networks 10 and 32, each of which preferably includes a plurality of individual computers 12a, 12b, 12c and 12d; and 30a, 30b, 30c and 30d respectively. Alternatively, a plurality of intelligent workstations with known voice capabilities coupled to a host processor may be utilized for each such network.

Each individual computer may be coupled to a storage device 14 and/or a printer/output device 16. One or more such storage devices 14 may be utilized to store various documents or software applications, which may be accessed by a client user within the data processing system 8.

Still referring to FIG. 1, data processing system 8 may also include multiple mainframe computers, such as mainframe computer 18, which may be preferably coupled to local area network 10 by means of communications link 22. Mainframe computer 18 may also be coupled to a storage device 20 which may serve as remote storage for local area network 10 and may also be coupled by a communications controller 26 and communications link 34 to a gateway server 28. Gateway server 28 is preferably an individual computer or intelligent workstation which serves to link local area network 32 to local area network 10.

Still referring to FIG. 1, the data processing system 8 preferably also includes an electronic calendar data base 36. The electronic calendar data base 36 preferably allows individual users of the data processing system 8 to maintain individual electronic calendars. Individual electronic calendars may also be maintained for physical assets such as conference rooms. Each individual electronic calendar will accept individual electronic calendar events. Each such event may include a start time, a stop time, and/or a duration of the event on a particular day or days. Each such electronic calendar event may also include information describing the scheduled location of the event. Information describing the scheduled location may include the names of persons that the individual user expects to meet with and the location of such scheduled meetings. In the case of a physical asset, such as a conference room, the information may include the names of persons expected to attend an event scheduled in the conference room. The information may also include an external telephone number or internal telephone extension or a physical address of any person whose name is included in the information.

The data processing system 8 also preferably includes an electronic directory database 38. The electronic directory database 38 preferably includes information such as the names, address, and external telephone numbers or internal telephone extension numbers of various persons, including individual users of the data processing system 8 and also other persons who are not users of the data processing system 8.

Figure 2:
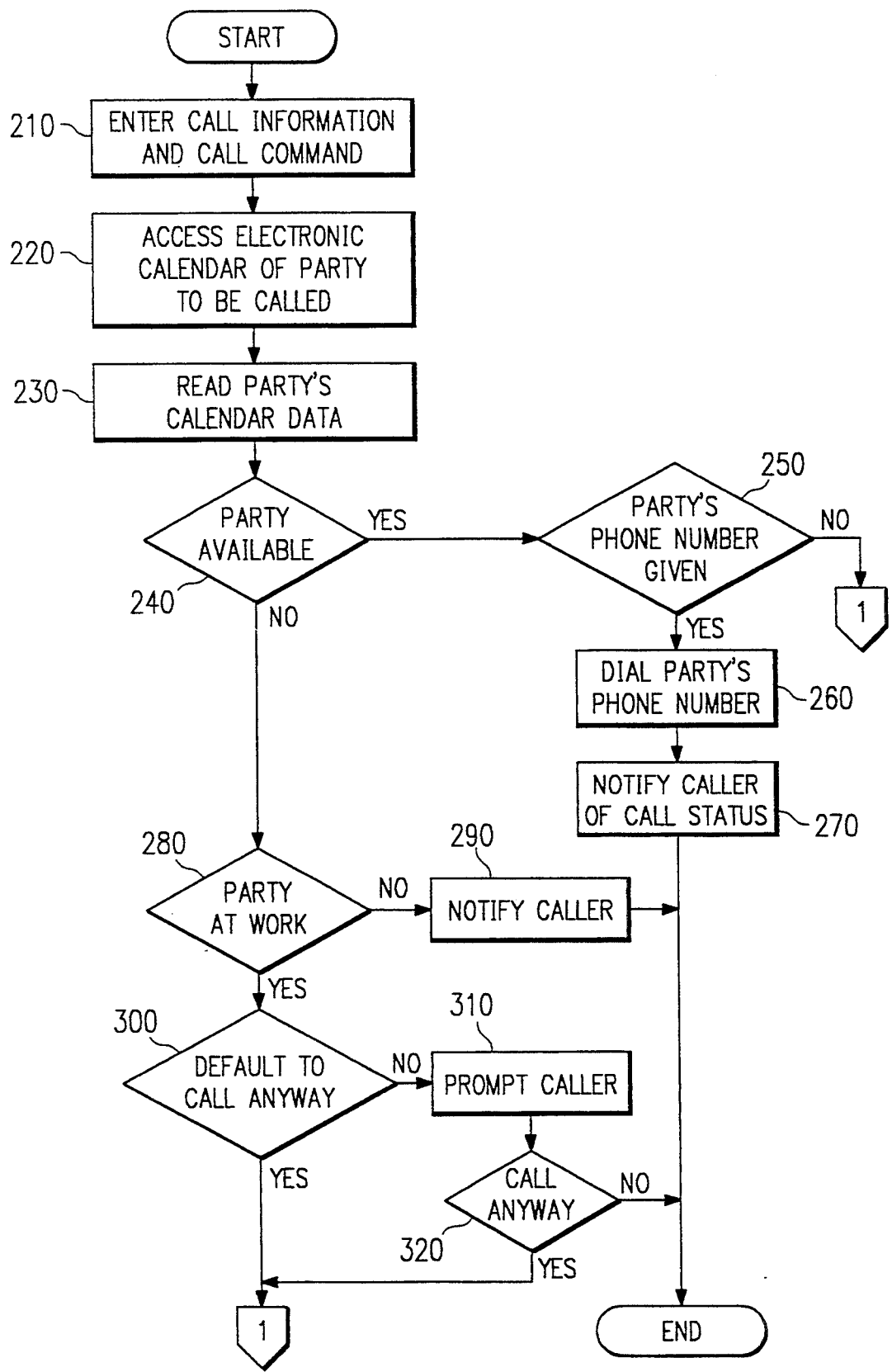
FIGS. 2 and 3 are a high level logic flowchart illustrating the method of a preferred embodiment of the present invention.
Figure 3:
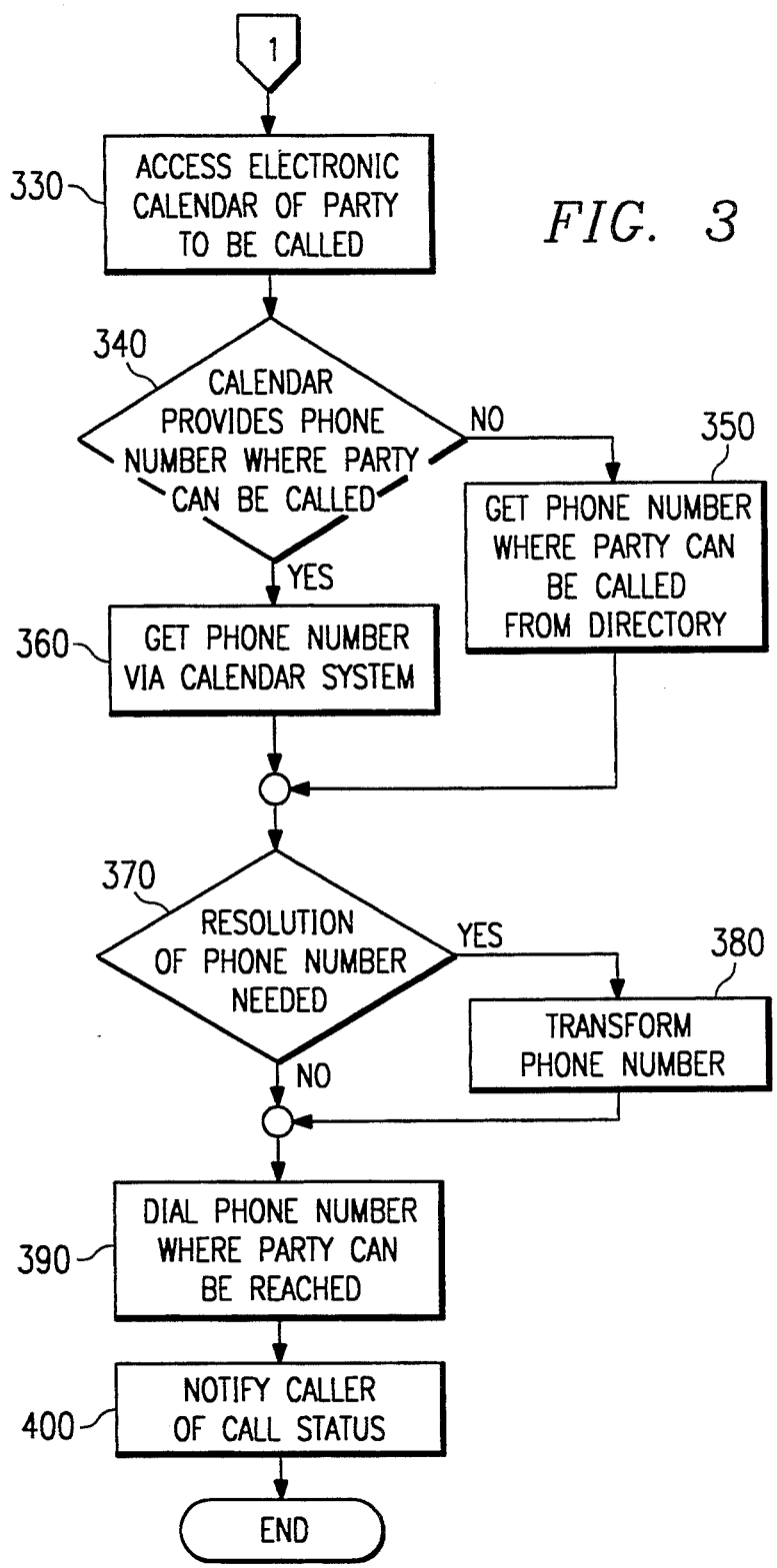

With reference now to FIGS. 2 and 3, there is depicted a high level flowchart which illustrates the method of a preferred embodiment of the present invention. The process begins at block 210 in which the user enters call information and a CALL command. The information and command may be entered by the user in different ways. For example, the user may type "CALL-partyname" on a command line, where "partyname" may be a name, a userid, an address or a telephone number. Alternatively, the user may select a party's name from a list of names appearing in the electronic directory and enter a CALL command. The CALL command may be entered by, for example, selection of a push button with a pointing device, use of a dedicated function key or the command line. Additionally, call information may be entered from an electronic calendar application. For example, while viewing his own calendar, a user may select a calendar event and enter the CALL command. Alternatively, while viewing another party's calendar, either another person or a physical asset such as a conference room, the user may select a calendar event and enter the CALL command. The data processing system 8 identifies the party to be called from the information found in the calendar entry describing the scheduled location of the event. This information may be a person's name or userid or some other specific information, such as a telephone number or office address, that would permit the identification of a specific person.

In block 210, the system will, as a default, assume that the user desires to place a call to the present location of the party; that is, the location of the party at the present time. However, the user may override this default to the present time, either by directly entering a different date and/or time, as on the command line, or by selecting a calendar event that is scheduled to occur at a different time.

The process next proceeds from block 210 to block 220 and accesses the electronic calendar of the party to be called. The identity of the party to be called is determined from the information directly entered by the user or information contained in the calendar event or directory entry designated by the user which describes the scheduled location of the party to be called.

The process next proceeds to block 230 and determines whether the electronic calendar of the party to be called includes a scheduled event at the time specified by the user. If present, the information describing the scheduled location of the party is read.

The process then proceeds from block 230 to block 240 and determines from the information read in block 230 whether the party is scheduled to be available at his customary location, such as his office. During normal business hours, this scheduled availability of the party to be called would ordinarily be determined by the absence of a calendar entry at the appropriate time. If it is determined that the party is scheduled to be available, the process proceeds from block 240 to block 250 and determines whether the party's telephone number is included in the call information, as would, for example, be the case if the party's identity were selected from an electronic directory. If yes, the process proceeds from block 250 to block 260 and dials the party's telephone number. The process then proceeds to block 270 and notifies the caller of the status of the call. The process then terminates.

Returning to block 250, if the party's customary telephone number is not included in the call information, the process proceeds from block 250 to block 330 of FIG. 3, to be discussed below.

Returning to block 240, if it was determined that the party is not scheduled to be available at his customary location, the process proceeds from block 240 to block 280 and determines whether the party is scheduled to be at work. ]During a work day, a calendar event such as vacation or holiday would permit a determination that the party is not scheduled to be at work. After working hours, the absence of a calendar event permits a determination that the party is not scheduled to be at work. If it is determined that the party is not scheduled to be at work, the process proceeds from block 280 to block 290 and notifies the caller that the party is not scheduled to be at work. The process then terminates.

Returning to block 280, if the process determines that the party is scheduled to be at work, the process proceeds to block 300 and determines what system default has been set. If the system default, in response to a CALL command, is to place the call to a party's scheduled location, the process proceeds to block 330 of FIG. 3, to be described below. If the system does not default to place the call, the process proceeds from block 300 to block 310 and prompts the caller whether he wishes to place the call to the party's scheduled location. The process then proceeds to block 320 to determine the caller's response. If the caller elects not to place the call anyway, the process terminates. If the caller elects to place the call, the process proceeds to block 330 of FIG. 3.

Turning next to FIG. 3, the process arrives at block 330 from either block 250, block 300 or block 320 of FIG. 2, as described above. In block 330, the process accesses the electronic calendar of the party to be called. The process then proceeds to block 340 and determines whether the calendar information provides a phone number of the scheduled location of the party. If yes, the process proceeds to block 360 and gets the telephone number from the calendar system. The process then proceeds to block 370. Returning to block 340, if the process determines that the electronic calendar information accessed in block 330 does not provide a telephone number of the scheduled location of the party, the process proceeds from block 340 to block 350 and uses a person's name or address in the calendar event to get, from the electronic directory, a telephone number for the scheduled location of the party. If the meeting is in a conference room, and a name is also given, the invention will default to searching for the telephone number of the conference room. The process then proceeds from block 350 to block 370.

In block 370 the process examines the telephone number to determine whether resolution of the telephone number is needed. For example, a private network telephone number may be provided when an outside line is needed or an outside line telephone number may be provided when a private network telephone number is needed. Similarly, incomplete telephone numbers or mere extensions may be provided, which require additional numbers to conform to, for example, a conventional seven digit or ten digit telephone number. If it is determined in block 370 that resolution of the telephone number is needed, the process proceeds from block 370 to block 380 and transforms the telephone number into the required form. The process then proceeds from block 380 to block 390.

Returning to block 370, if it is determined that resolution of the telephone number is not needed, the process proceeds directly from block 370 to block 390. In block 390 the process dials the telephone number of the scheduled location of the party. The process then proceeds from block 390 to block 400 and notifies the caller of the status of the call. The process then terminates.

Upon reference to the foregoing, it will be appreciated that the applicants have provided a novel and useful telephone calling method and apparatus. While the invention has been particularly shown and described with reference to a preferred embodiment and process, it will be understood that various changes in form and detail may be made therein without departing from the spirit and scope of the invention.

What is claimed is:

1. A method, performed in a data processing system, for placing telephone calls to individual parties, said data processing system including an electronic calendar database having information describing scheduled locations of said individual parties at various dates and times and said data processing system further including an electronic directory database of information associated with telephone numbers, wherein said electronic directory database is a separate database from said electronic calendar database, the method comprising the computer implemented steps of:

in response to user designation of a party to be called and input of a CALL command, searching the electronic calendar database for information describing a scheduled location of the designated party at the date and time of the input of the CALL command;

determining that the information of the electronic calendar database describing the scheduled location of the designated party does not include a telephone number of the scheduled location of the designated party;

searching the electronic directory database for a telephone number associated with the information describing the scheduled location of the designated party; and placing a telephone call to the telephone number associated with the information describing the scheduled location of the designated party.

2. A method, performed in a data processing system, for placing a telephone call, said data processing system including an electronic calendar database of scheduled events, said electronic calendar database having information describing scheduled locations of scheduled events at various dates and times, the method comprising the computer implemented steps of:

in response to user selection of a scheduled event of the electronic calendar database, said electronic calendar database including information describing a scheduled location of the selected event, and input of a CALL command, searching the electronic calendar database for the information describing the scheduled location of the selected event; and placing the telephone call to the scheduled location of the selected event.

3. The method of claim 2, wherein the information describing the scheduled location of the selected event includes a telephone number of the scheduled location of the selected event, and wherein the computer implemented step of placing the telephone call to the scheduled location of the selected event includes the computer implemented step of placing the telephone call to the telephone number of the scheduled location of the selected event.

4. The method of claim 2, wherein said data processing system further includes an electronic directory database of information associated with telephone numbers, the method further comprising the computer implemented step of searching the electronic directory database for a telephone number associated with the information describing the scheduled location of the selected event prior to placing the telephone call to the scheduled location of the selected event, and wherein the computer implemented step of placing the telephone call to the scheduled location of the selected event includes the computer implemented step of placing the telephone call to the telephone number associated with the information describing the scheduled location of the scheduled event.

5. The method of claim 4, wherein the information of the electronic calendar database describing the scheduled location of the selected event does not include a telephone number of the scheduled location of the selected event.

6. A data processing system for placing telephone calls to individual parties, comprising:

an electronic calendar database having information describing scheduled locations of said individual parties at various dates and times;

an electronic directory database of information associated with telephone numbers, wherein said electronic directory database is a separate database from said electronic calendar database;

means for searching, in response to user designation of a party to be called and input of a CALL command, the electronic calendar database for information describing a scheduled location of the designated party at the date and time of the input of the CALL command;

means for determining that the information of the electronic calendar database describing the scheduled location of the designated party does not include a telephone number of the scheduled location of the designated party;

means for searching the electronic directory database for a telephone number associated with the information describing the scheduled location of the designated party; and means for placing a telephone call to the telephone number associated with the information describing the scheduled location of the designated party.

7. A data processing system for placing a telephone call, comprising:

an electronic calendar database of scheduled events, said electronic calendar database having information describing scheduled locations of scheduled events at various dates and times;

means for searching, in response to user selection of a scheduled event of the electronic calendar database, said electronic calendar database including information describing a scheduled location of the selected event, and input of a CALL command, the electronic calendar database for the information describing the scheduled location of the selected event; and means for placing the telephone call to the scheduled location of the selected event.

8. The data processing system of claim 7, wherein the information describing the scheduled location of the selected event includes a telephone number of the scheduled location of the selected event, and wherein the means for placing the telephone call to the scheduled location of the selected event includes means for placing the telephone call to the telephone number of the scheduled location of the selected event.

9. The data processing system of claim 7, further comprising:

an electronic directory database of information associated with telephone numbers; and means for searching the electronic directory database for a telephone number associated with the information describing the scheduled location of the selected event prior to placing the telephone call to the scheduled location of the selected event; and wherein the means for placing the telephone call to the scheduled location of the selected event includes means for placing the telephone call to the telephone number associated with the information describing the scheduled location of the scheduled event.

10. The data processing system of claim 9, wherein the information of the electronic calendar database describing the scheduled location of the selected event does not include a telephone number of the scheduled location of the selected event.

* * * * *